D. W. McCALLUM.
AUTOMATIC GATE.
APPLICATION FILED NOV. 29, 1918.

1,354,320.

Patented Sept. 28, 1920.
3 SHEETS—SHEET 1.

Inventor:
Daniel W. McCallum
By Edward E. Lingan
atty.

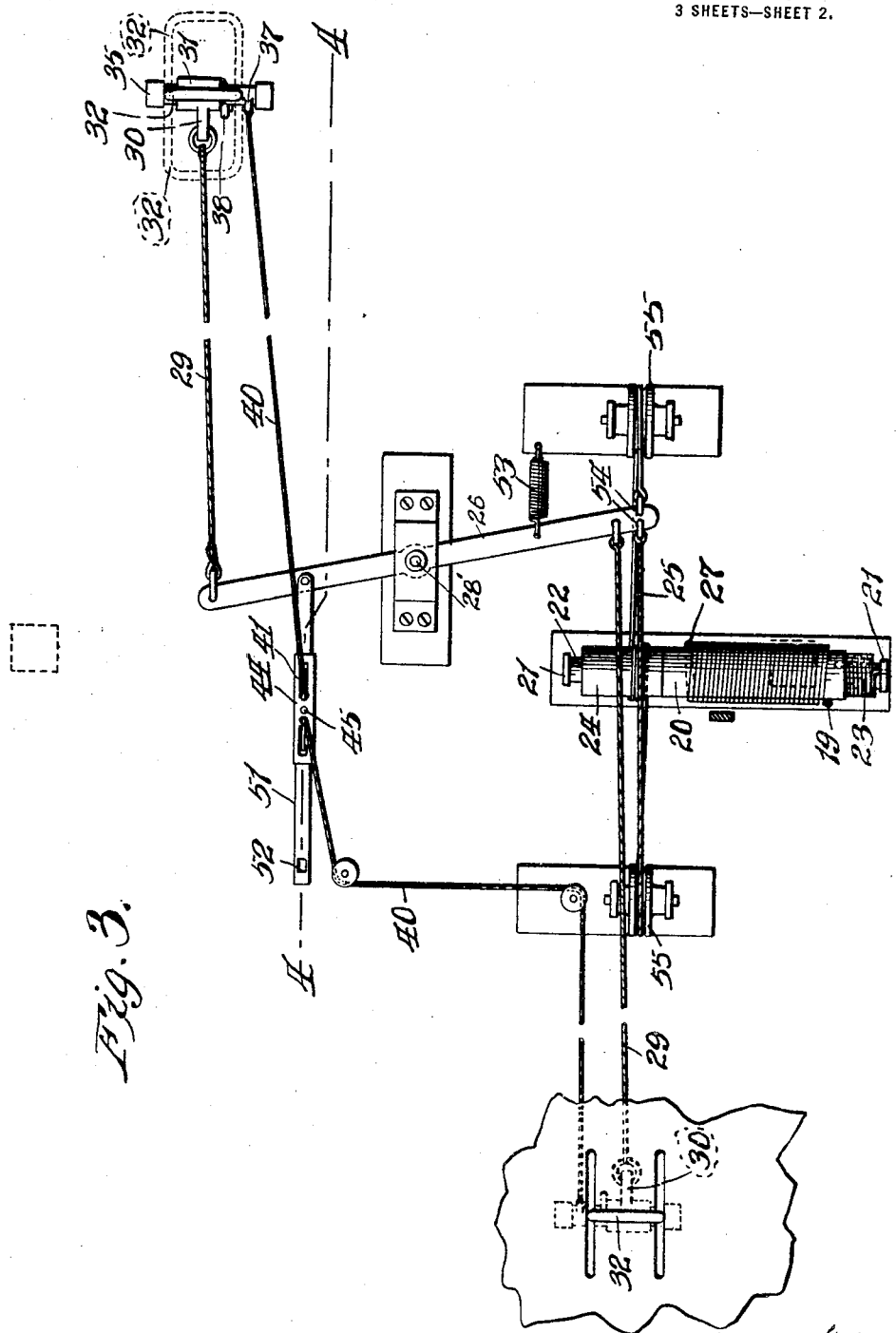

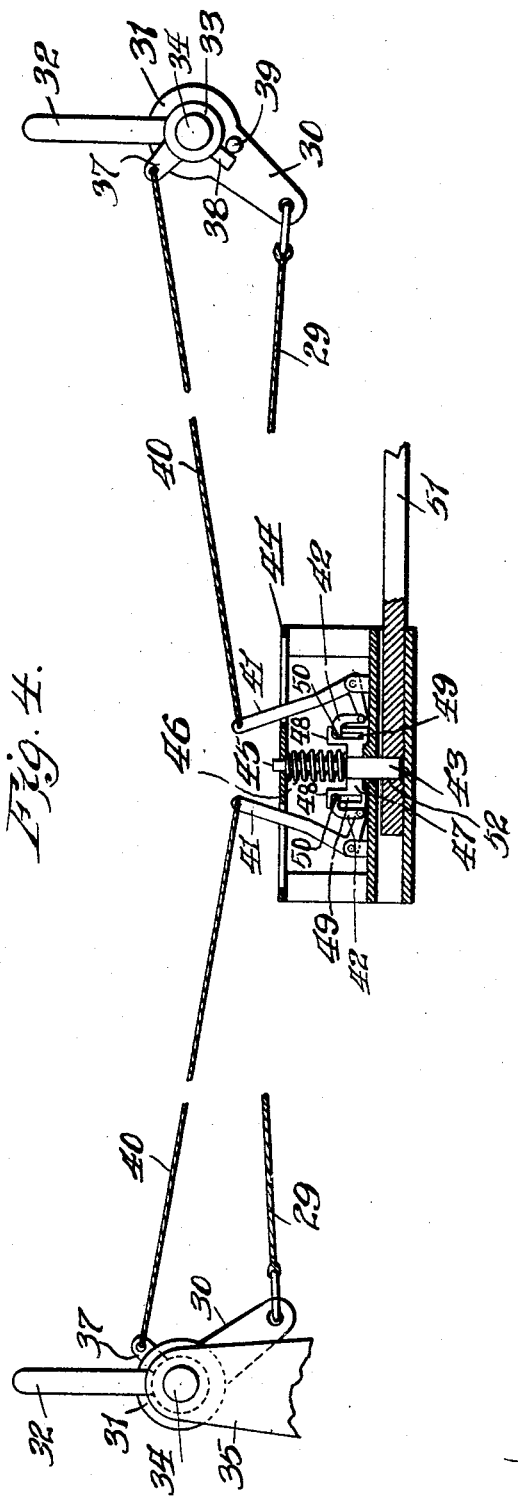
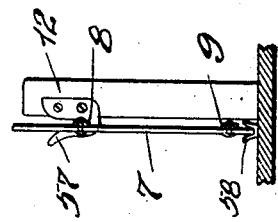
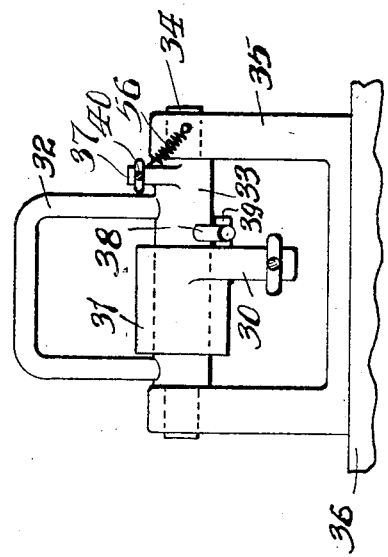

UNITED STATES PATENT OFFICE.

DANIEL W. McCALLUM, OF ST. LOUIS, MISSOURI.

AUTOMATIC GATE.

1,354,320.  Specification of Letters Patent.  Patented Sept. 28, 1920.

Application filed November 29, 1918. Serial No. 264,575.

*To all whom it may concern:*

Be it known that I, DANIEL W. MCCALLUM, a citizen of the United States, and resident of St. Louis and State of Missouri, have invented certain new and useful Improvements in Automatic Gates, of which the following is a specification containing a full, clear, and exact description, references being had to accompanying drawings, forming a part thereof.

My invention relates to improvement in automatic gates and has for its primary object a gate, which is raised vertically by the trip of a lever, thus preventing the stalling of the gate in a deep snow, which is common with automatic swinging gates of the present type.

A further object is to provide a gate which will automatically operate by the contact of vehicle wheels with levers located in the wheel path and do away with the necessity of stopping the vehicle to open or close the gate.

Another object is to provide an automatically operating gate, which may be used by railroads so that when the approaching train comes within a predetermined distance of a public road crossing, the gate is automatically lowered so as to close the passage across the tracks.

In the drawings:

Fig. 3 is a plan view of the operating mechanism made use of.

Fig. 4 is a view of a locking mechanism with parts in section which holds the gate in upright position.

Fig. 5 is a view of the mechanism which opens and closes the gate.

Fig. 6 is a view taken on the line 6—6 of Fig. 1 viewing the same in the direction of the arrow and showing the means for holding the gate against swinging movement.

Figure 1:
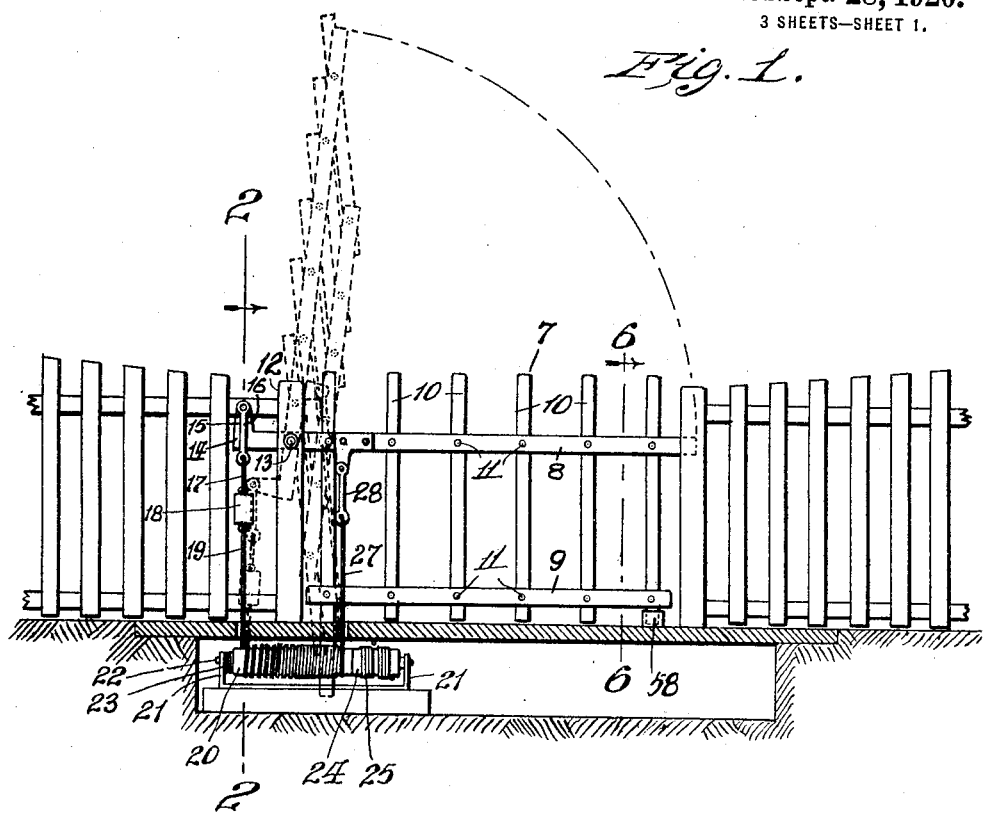
Figure 1 is a front view of my device showing the gate in raised position by dotted lines.
Figure 2:
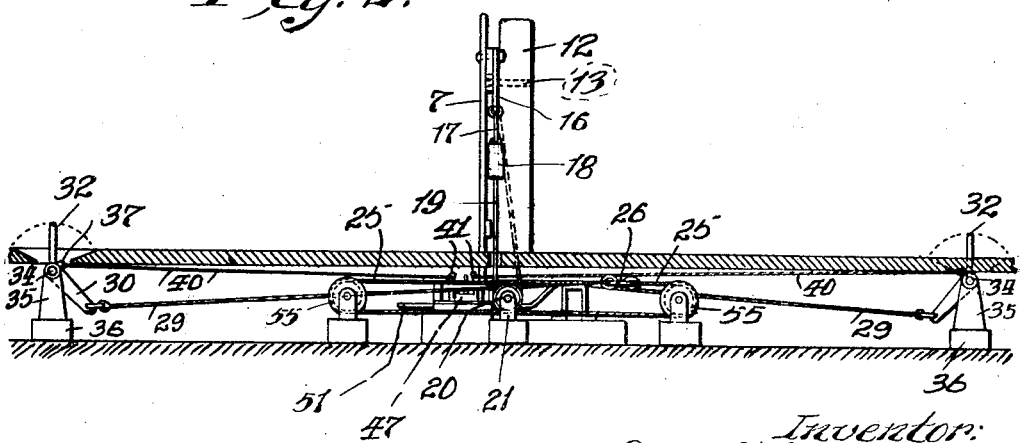
Fig. 2 is a vertical sectional view taken on the line 2—2 of Fig. 1 and viewing the same in the direction of the arrow.

In the construction of my device, I provide a gate 7, which is constructed of a pair of horizontal bars 8 and 9 and a plurality of vertical pickets 10. These pickets 10 are swivelly connected to the bars 8 and 9 by rivets 11. The bar 8 is pivotally connected to a standard 12 by means of a pivot 13 and is provided on its projecting end 14 with an extension 15 to which a link 16 is connected. Connected to the link 16 is a short cable 17 to the end of which is secured a counter-weight 18. This counter-weight may be formed either solid or be hollow so that heavy material may be placed therein which will act as a counter balance for the weight of the gate.

Attached to the bottom end of the counter-weight 18 is a cable 19 which cable is wound around a drum 20, this drum 20 being secured between the bearings 21. The drum 20 is loosely mounted on a shaft 22 and securing the drum 20 to the shaft 22 is a coil spring 23 which acts as a buffer so as to absorb the strain, when one of the trip levers, herein after to be described, is struck by a rapidly moving vehicle, thus taking the strain or sudden jolt off of the gate 7 and its operating cables.

The coil spring 23 acts similar to the coil spring in a shade roller in that it takes up any sudden jolt off of the drum 20 but is of sufficient strength that when the initial shock has been taken up by the spring the roller 20 is revolved by the spring and the gate will be raised.

Securely attached to the shaft 22 is a second drum 24 around which is a cable 25, both ends of which are attached to a lever 26, the cable 25 operating the drum 24 and shaft 22 so as to wind or unwind the cable 19. Around the drum 20 is also wound a cable 27, which is attached to a link 28, which unwinds when the cable 19 is wound upon the drum 20 and to wind when the cable 19 is unwound. The cables 19 and 27 having the tendency to pull the gate up or down when the device is operated.

The lever 26 is pivotally mounted as indicated by the numeral 28' which pivot is practically midway of its length and secured near the outer ends of this lever are cables 29, these cables 29 being attached to arms 30 of the tripping mechanism consisting of a sleeve 31, which forms an integral part of the arms 30 and a U-shaped lever 32, which is provided with a bearing portion 33 and shaft 34 extending through the bearing 33 and 31. This shaft 34 is mounted in a support 35, which support is mounted on a base 36, this base being of any suitable construction. On the bearing 33 is an arm 37, which is formed integral therewith and projecting from the bearing 33 is a pin 38. This pin 38 contacts with a pin 39 formed on the arm 30, these pins operating the arm 30 when the U-shaped lever is operated in one direction and when the U-shaped lever 32 is operated in the opposite direction, the arm 30 is not disturbed or operated.

To the arm 37 is connected a cable 40, which is attached to a bell crank lever 41, this bell crank lever operating the locking device. To the short end of the bell crank lever 41 is attached an L-shaped lever 42, which operates the locking bolt 43. This locking bolt is located in the casing 44 and is provided with a cylindrical projection 45. Surrounding this cylindrical projection and located within the casing 44 is a coil spring 46, this coil spring having a tendency to force the bolt or locking device 43 downwardly. Connected to the bolt or locking device 43 is a yoke 47, this yoke being provided with members 48, which members have vertical slots 49 formed therein, these slots allowing rivets or like connecting members 50 to extend therethrough, so that the bolt 43 may be raised from one side only and will not interfere with the bell crank mechanism on the other side.

Attached to the lever 26 is a bar 51, which slides in the housing 44. This bar is provided with an opening 52 in which the locking bolt 43 is adapted to be seated when the gate is raised. In order to provide a quick return of the lever 26, I provide a coil spring 53, which has the tendency to draw the lever back to its original or starting position. The cable 25 is attached to the lever 26 at points indicated by the numeral 54 and from there passes over the sheave wheels 55 and around the drum 24. In order to bring the U-shaped lever into upright position, I provide a coil spring 56, so that when the vehicle has passed over these levers they will assume their vertical position immediately and be ready for the next impact of vehicle wheels traveling in either direction.

On the upright standard 12, I provide a guide 57, which holds the upper part of the gate and secures it from a swinging movement and at the bottom of the upright standard 12, I provide a U-shaped socket 58 into which the bottom of one picket of the gate fits which will prevent any swinging movement of the bottom portion thereof.

The operation of my device is as follows: A vehicle, driving along the road, strikes the U-shaped lever thus raising the gate as indicated by the dotted lines in Fig. 1 and after the vehicle has passed through the gate, it strikes the opposite U-shaped lever thus releasing the bolt and allowing the gate to close. In this way there is no swinging gate or overhead levers as have been used up to this time and by use of the counter weight, the strain put on the raising cables can be reduced to a minimum or, in other words, the gate can be made to weigh sufficient so that stock can not raise the same to enter or leave the premises.

Having fully described my invention, what I claim is:

1. An automatic gate comprising a pair of horizontal bars, two vertical standards, the uppermost horizontal bar being pivotally attached to one of said vertical standards, cables swivelly attached to the uppermost horizontal bar, a roller around which said cables are wound, a shaft carrying said roller, a spring interposed between the roller and shaft, a second roller securely mounted on said shaft, a cable wound around said second roller, a lever mechanism to which said second mentioned cable is attached, and means for operating the lever mechanism to revolve both rollers.

2. An automatic gate comprising a pair of horizontal bars, two vertical standards, the uppermost horizontal bar being pivotally attached to one of said vertical standards, a socket carried by the opposite standard to receive one end of said horizontal bar, cables swivelly attached to the uppermost horizontal bar, a roller around which said cables are wound, a shaft carrying said roller, a spring interposed between the roller and shaft, a second roller securely mounted on said shaft, a cable wound around said second roller, a lever mechanism to which said second mentioned cable is attached, and means for operating the lever mechanism to revolve both rollers for raising and lowering the gate.

In testimony whereof, I have signed my name to this specification, in the presence of two subscribing witnesses.

DANIEL W. McCALLUM.

Witnesses:
EDWARD E. LONGAN,
WALTER C. STEIN.